June 12, 1928.
G. H. PERRY
1,673,636
CUSHION FOR SEATS AND THE LIKE
Filed Jan. 24, 1928     3 Sheets-Sheet 1
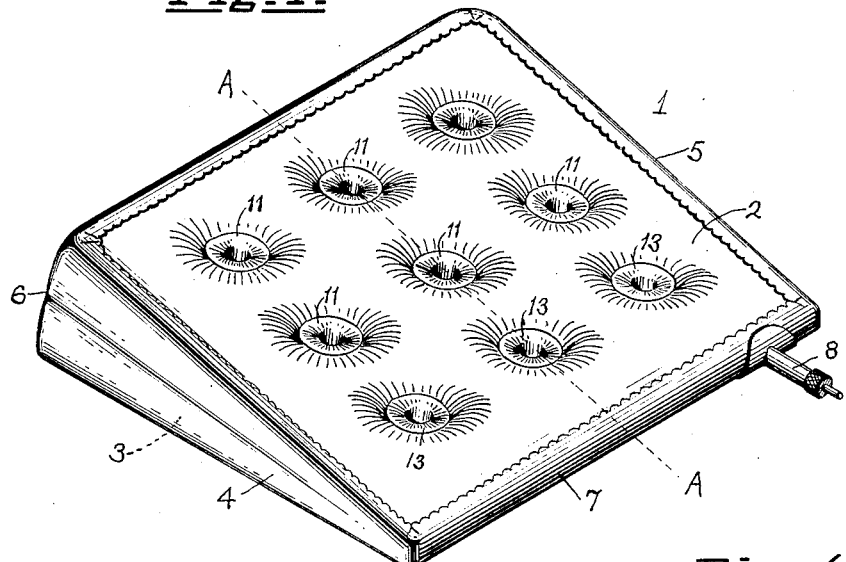
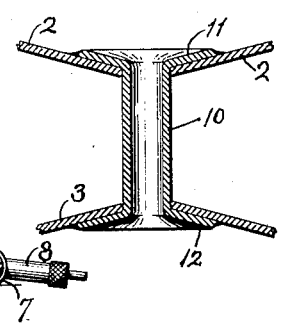
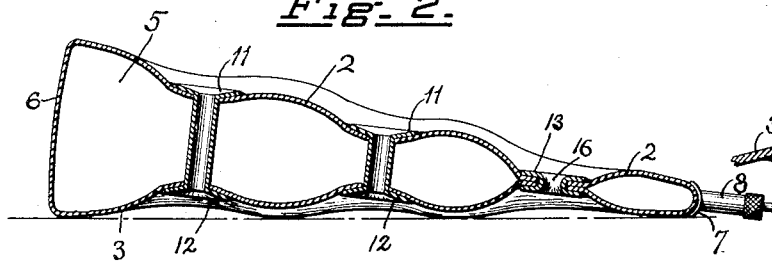
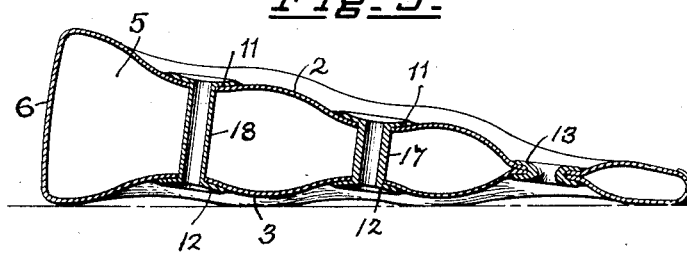
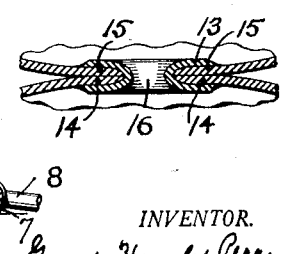
INVENTOR.
George Haugh Perry
BY
ATTORNEYS.

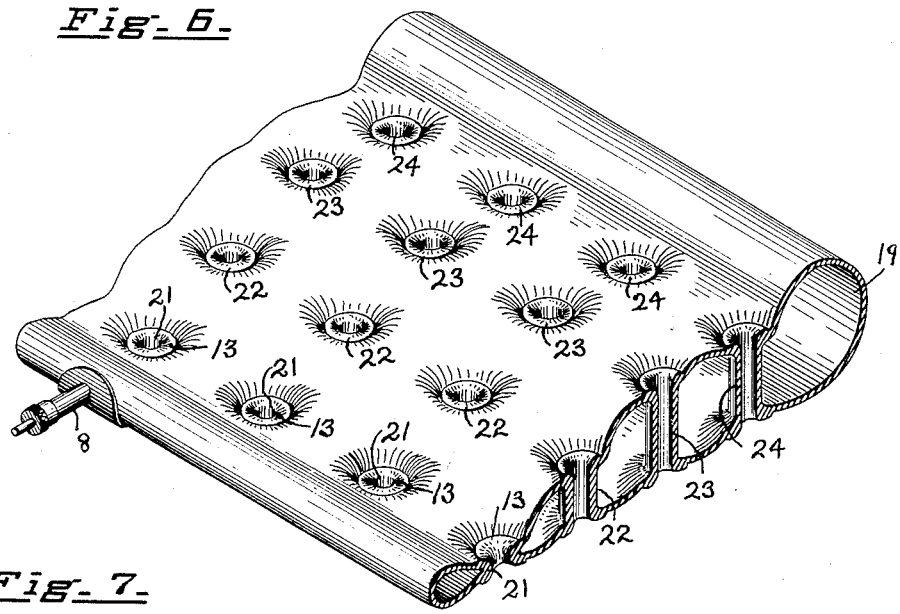
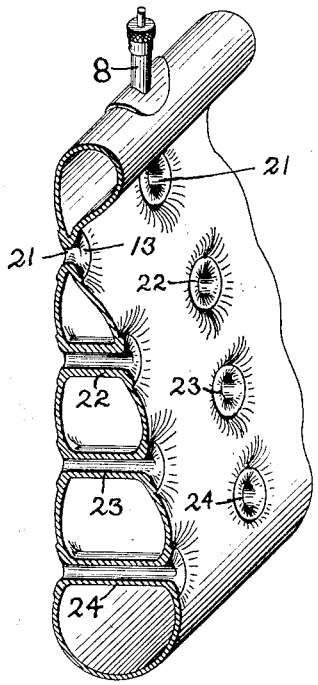
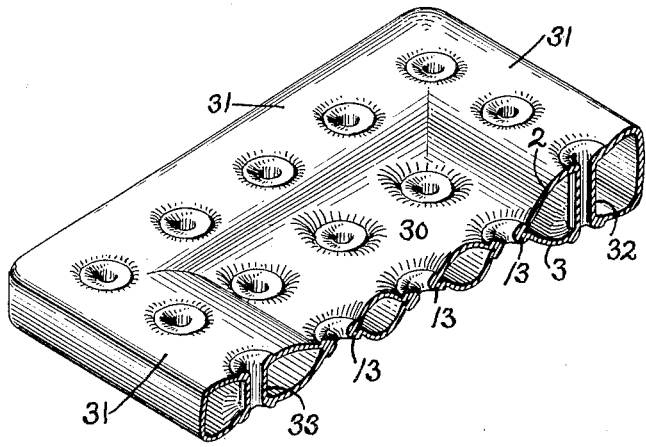

June 12, 1928.  G. H. PERRY  1,673,636
CUSHION FOR SEATS AND THE LIKE
Filed Jan. 24, 1928   3 Sheets-Sheet 3
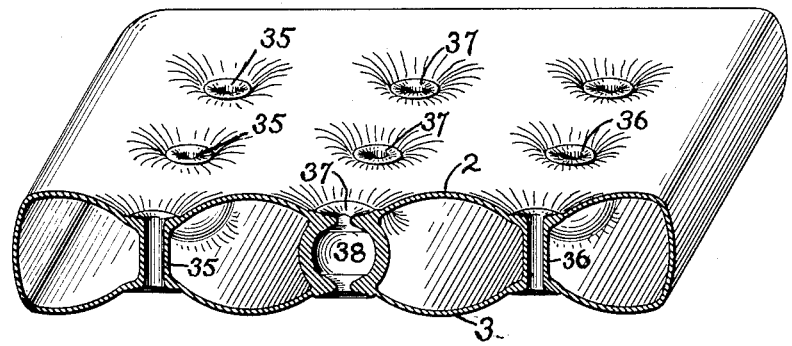
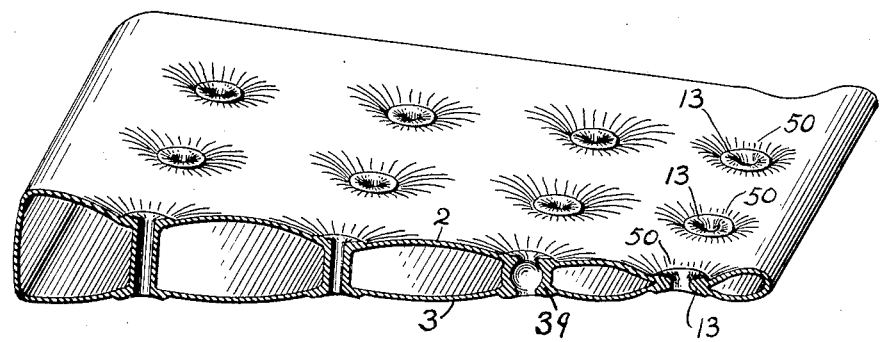
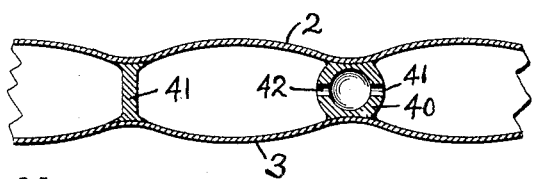
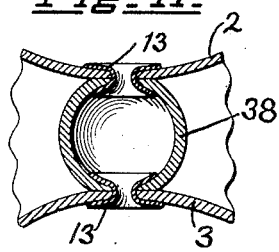
INVENTOR.
George Haugh Perry
BY
ATTORNEYS.

Patented June 12, 1928.

1,673,636

UNITED STATES PATENT OFFICE.

GEORGE HOUGH PERRY, OF NEW YORK, N. Y.

CUSHION FOR SEATS AND THE LIKE.

Application filed January 24, 1928. Serial No. 249,001.

This invention relates to cushioning devices, and with respect to its more specific features, to cushions of the inflatable type which may be adapted for various uses but more particularly as part of the seat equipment of automobiles and other vehicles.

One of the objects of the invention is the provision of a practical character of pneumatic cushion especially adapted for being made of relatively simple construction and of a variety of different shapes and so as to be utilizable efficiently and comfortably under different conditions and in various places and positions.

Another object of the invention is the provision of a cushion having comfortable pneumatic cushioning effect and sufficient stability securely to support the person under the varying conditions of use.

Another object of the invention is the provision of a cushion of the character described which better accommodates itself to the weight of the person resting thereon, the greater or more concentrated weight of the person being supported by a more stable part of the resilient cushion, whereas movable parts, such as the legs of the person, are likewise resiliently cushioned but in a relatively more mobile manner so as to permit considerable free but cushioned movement of the legs.

Another object of the invention is the provision of a cushion of the character described in which the pneumatic cushioning effect is supplemented by a cushioning effect due to members not necessarily dependent on inflation of their resiliency, so that in case of whole or partial deflection of the pneumatic member, a comfortable cushioning effect is retained.

Another object of the invention is the provision of a practical and efficient seat cushion composed of an inflatable bag of elastic rubber and of a size commensurate with the seat area, which bag, nevertheless, will not uncomfortably bulge at one area thereof when the pressure thereon is concentrated at another area.

Other objects of the invention will be in part obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention, reference should be had to the following description taken in connection with the accompanying drawings, in which:

Fig. 1 is a perspective view of a pneumatic cushion embodying certain features of the invention;

Fig. 2 is a section from front to rear of the cushion of Fig. 1 on the line A—A;

Fig. 3 is a view similar to Fig. 2 but showing a modified construction;

Figs. 4 and 5 illustrate details of Figs. 1, 2 and 3;

Fig. 6 is a perspective view partly in section, of a seat cushion, of a modified design as compared with Figs. 1, 2 and 3;

Fig. 7 is a view of a cushion adapted as a back cushioning member for the seat cushion of Fig. 6;

Fig. 8 is a perspective view partly in section showing a still different modified form of cushion;

Figs. 9 and 10 are perspective views of two additional modified forms of seat cushion, certain special additional details being shown in these figures;

Fig. 11 is an enlarged detailed view illustrating in more detail a portion of the cushion shown in Figs. 9 and 10;

Fig. 12 is a sectional detail of a further modification of a portion of the cushion.

Referring now more specifically to the drawings, in Fig. 1 is illustrated a seat cushion of wedge shape in longitudinal section when inflated, and consisting of an inflatable bag indicated generally by the numeral 1, the bag being made of soft, flexible material, such as elastic sheet rubber, the upper wall 2 and the lower wall 3 of the bag inclining toward each other when the bag is inflated. The two side walls 4 and 5 and the end walls 6 and 7 may be embodied in a single strip of sheet rubber securely connected to the edges of the walls 2 and 3, as by being vulcanized thereto. The numeral 8 indicates the valve through which the bag may be inflated and deflated. It will be understood that in each instance the inflatable bag is air-tight and may be readily inflated and deflated through the valve 8.

The opposite walls 2 and 3 of the bag are connected to each other at a plurality of points distributed over the areas of said walls in a manner to restrict relative separating movement, or displacement, between said walls at each of said points when the bag is inflated. To this end said opposite walls 2 and 3 are tied to each other at each of said points. In the embodiment illustrated in Figs. 1 and 2 the ties for the front or deeper portion of the bag are indicated at 9 and 10, being relatively long elastic flexible ties of soft material, as rubber, extending between and connecting said two walls. In the embodiment illustrated in Fig. 2 the ties 9 and 10 are straight tubular members having upper and lower flanges 11 and 12, these flanges flaring outwardly and lapping onto the outside of the wall 2 and 3 respectively, to which latter they are vulcanized, said walls having openings through which the ends of the tubes 9 and 10 extend, as illustrated. Adjacent the rear or shallower part of the bag of Figs. 1 and 2 the upper and lower walls 2 and 3 are brought close together and also in contact with each other, and a disk 13, which is preferably of soft, elastic material, as rubber, is passed through registering openings in the upper and lower walls and vulcanized to said upper and lower walls, so as to form an airtight joint and securely fasten the contacting portions of said walls against lateral movement relative to each other. Also, it will be understood that the vulcanization of the flanges 11 and 12 of the tubes 9 and 10 to the walls 2 and 3 also forms airtight joints, so that escape of air from the bag is normally permitted only when the inflating valve 8 is open. As illustrated, the disks 13 may be circular members having peripheral grooves in which the edges 14 and 15 of the openings of the upper and lower walls lie in contact with each other. Also the disks 13 are annular, having central openings, or apertures 16 through which a lacing may be passed for the purpose of assisting in retaining the cushion in place on its support. The openings 16 also assist in ventilating when the person is seated thereover. If the annular design of the members or disks 13 is not desired, the openings 16 may be omitted and an imperforate disk used. But the annular disk facilitates assemblage of the upper and lower walls in close contact with each other and in a practical manner.

In practice, the inflatable bag may be made by assembling the upper and lower sheet rubber walls 2 and 3 with the rubber strip forming the sides 4 and 5 and ends 6 and 7, when said elements are in an uncured or unvulcanized state. Also the tubes 9 and 10 and the disks 13 in an uncured condition will be set in their proper relation to and between the sheets 2 and 3. Thereupon the assembled elements may be placed in a mold of the shape desired for the bag, and air under pressure introduced through the inflating valve 8 will cause all parts of the bag to be pressed against the walls of the mold and take the shape of the mold, the disk 13 and the flanges 11 and 12 being firmly pressed into contact with the walls 2 and 3. Thereupon the assembled parts may be subjected to the vulcanizing process in a generally similar mold with the result that all the joints will be firmly vulcanized together and efficiently retained in place, and an airtight bag will be formed which, when inflated, will take the designed shape without any excessive stress being placed upon the material of the bag.

It will be noted that the relatively long ties 9 and 10 permit considerable mobility of lateral movement between the walls 2 and 3, whereas at the points where these walls are fastened together by the disks 13 practically no lateral movement between such walls is permitted. Where the disks 13 occur said walls are substantially fixed against lateral movement relative to each other. It will be seen, therefore, that the resistance to relative lateral movement between the walls 2 and 3 at the points where the disks occur is greater than at the points where these walls are connected by the ties 9 and 10, so that the mobility of the bag is modified over all, the shallower end being the more stable, and the stability gradually decreasing toward the deeper end of the bag, at which latter end the mobility is greatest in the embodiment illustrated in Figs. 1, 2 and 3. Not only is the mobility decreased by reason of substantial prevention of lateral movement between the walls 2 and 3 at the points 13, but separating movement between said walls at such points is likewise restricted so that the mobility of the bag is lessened by reason of the prevention of the separating movement at such points.

It will be perceived, therefore, that by the construction described, the stability of the inflated bag is different at different areas of the bag. In this wise, if the person be seated upon a cushion as illustrated in Figs. 1 and 2, with the legs depending in front of the deeper end of the bag, the greater portion of his weight will be concentrated at the shallower part of the bag where the latter is more stable, whereas the highly mobile, deeper part of the bag will cushion the legs but will not seriously impede free movement thereof, all of which will make for the comfort of the person seated. The mobile front of the bag enables the driver of an autobile to move his legs without ontoward interference by the cushion, while the greater portion of his weight is stably supported and comfortably cushioned at the rear of the cushion.

The stability and mobility of different portions of the cushion may be varied, as for instance by utilizing ties of different kinds at predetermined points distributed over the opposite walls 2 and 3. By utilizing at certain of said points ties of greater resistance to elongation than at other points the resistance to separating movement between the walls 2 and 3 may be increased with consequent modification of mobility, as for instance in Fig. 3 where the tie 17 is of heavier or thicker rubber than the tie 18, with consequent greater resistance to separating movement between the walls 2 and 3 at the points where the ties 17 are located, as compared with the points where the ties 18 are located. Also the heavier ties 17 have low resistance to transverse bending as compared with that of the lighter ties 18. In Fig. 3 as in Fig. 2, the walls 2 and 3 at the shallower end of the bag are elastically bound in close proximity to each other by the disks 13.

In the construction illustrated in Fig. 6, the arrangement is somewhat like that in Fig. 3, but the ties are closer together, there are more ties, and the front end of the bag has a large mobile rounded swell 19. In Fig. 6, the upper and lower walls 2 and 3 are brought into contact and secured to each other at the points 21 and by disks 13 in the same manner as in Figs. 1, 2 and 3. Furthermore, the ties 22, 23 and 24 are connected to the upper and lower walls in the same manner as are the ties of Figs. 1, 2 and 3, and the walls of the ties increase in thickness as they approach the front end 19 of the bag, in consequence of which their resistance to elongation is greater, as well as their resistance to bending, so that the cushion is of considerable stability over a relatively large area, but the front is highly mobile.

In the modification illustrated in Fig. 7, the construction is very similar to that illustrated in Fig. 6. The cushion of Fig. 7 is intended to be employed in conjunction with that of Fig. 6, the cushion of Fig. 6 to be the seat for the person, the cushion of Fig. 7 being a bag for such seat.

It will be understood that Fig. 8 illustrates only one-half of a complete cushion, the other half having been omitted in the figure to show the internal construction. In Fig. 8 the cushion is rectangular and has a central or main seating area 30 in a lower plane than the raised edge or rim 31. The upper and lower walls 2 and 3 at the main seating area 30 are fastened to each other against relative lateral movement by disks 13 in the same manner as by the disks 13 illustrated in Figs. 1 and 2. The raised edge 31 is formed by deeper parts of the bag, and its generally flat upper and lower faces are connected by the ties 32 and 33 which are of the same thickness but are different in length. In Fig. 8 the cushion is also deeper at one end than the other. In this construction of seat the pneumatic cushioning effect is very efficiently maintained but the stability of the main seat portion is greatly increased by the large number of points at which the upper and lower walls are held against relative movement. The rim portion 31 is stabilized by the ties 32 and 33 but is more mobile than the main seat portion.

In order to provide for supplemental cushioning effect by the ties in addition to the pneumatic cushioning effect of the bag, the ties may be constructed to serve as supplemental cushions, as for instance they may be of ball shape, this shape being adapted constantly to furnish a supplemental cushion between the upper and lower walls regardless of lateral movement between said walls and whether the cushion be inflated or deflated. In Fig. 9 a construction is illustrated in which the upper and lower walls 2 and 3, besides being tied to each other at 35 and 36, as heretofore explained, are also tied to each other at the plurality of points 37 by hollow rubber balls 38 which may be secured to the upper and lower walls 2 and 3 in the manner illustrated in Fig. 11. In Fig. 11 the balls 38 and the upper and lower walls 2 and 3 have openings registering with each other, through which pass disks 13 which secure the balls to the walls in the manner explained in connection with Figs. 1 and 2.

In Fig. 9 the ball ties are illustrated as being disposed between the straight, tubular ties 35 and 36. The ball ties may be made thick or thin, as dictated by the cushioning and tieing effect desired.

In Fig. 10 a raking type of cushion is illustrated, utilizing balls 39 similar to the balls 38 but disposed at the shallower end of the cushion instead of at the middle. For hard usage, as in trucks, this furnishes a very efficient seat.

In Fig. 12 the numeral 40 indicates a rubber ball the upper and lower portions of which are vulcanized to the inner faces of the walls 2 and 3 of the cushion, there being no apertures or openings in the walls 2 and 3 opposite the balls. Similarly the numeral 41 indicates a solid rubber tie vulcanized to the inner faces of the walls 2 and 3. The ball 40 has ports 41 and 42 in its wall, freely communicating with the space between the cushion walls 2 and 3.

Referring to Fig. 10, it will be seen that the bag illustrated not only is constructed with the ball tie 39 but also that the upper and lower walls 2 and 3 are brought close to each other, and secured against lateral movement relative to each other at the points 50. The fastening at the points 50 may include the disks 13 as in Figs. 1, 2 and 3.

By the invention described a marked difference in the degree of resistance to relative separating movement between different of the connected points of walls 2 and 3 is attainable. By locating these points of different resistance in different relations to each other, bags may be made in which the more mobile parts may be at one certain area and the more stable parts at another and different area, the invention making for assurance of having the mobile and stable qualities at certain predetermined parts of the inflated bag. By associating this difference in resistance to separating movement with the feature of difference in resistance to relative lateral movement between different connected points of said walls, it is possible to make bags of a diversity of shapes having relatively stable and mobile areas where intended.

It will be understood that after the bag 1 has been made of rubber as explained, the ties and the disks aforementioned become integrally connected to the walls of the bag so that, in effect, a one piece structure is produced. It will also be understood that the cushion may be made in other practical ways, and that the invention contemplates that other materials than rubber may be utilized in making the bag.

Since certain changes may be made in the article and different embodiments of the invention could be made without departing from the scope thereof, it is intended that all matter contained in the above description or shown in the accompanying drawing shall be interpreted as illustrative and not in a limiting sense.

Having described my invention what I claim as new and desire to secure by Letters Patent is:

1. A cushion of the character described having, in combination, an inflatable bag of soft, flexible material, two opposite walls of said bag connected to each other at a plurality of points distributed over the area of said walls so as to restrict relative separating movement between said walls at said points when the bag is inflated, said walls being fixed against lateral movement relative to each other at certain of said points, and said walls at other of said points having limited lateral movement therebetween.

2. A cushion of the character described having, in combination, an inflatable bag of soft, flexible material, two opposite walls of said bag connected to each other at a plurality of points distributed over the area of said walls so as to restrict relative separating movement between said walls at said points when the bag is inflated, and soft elastic cushions constantly in cushioning position between said walls, said walls being fixed against lateral movement relative to each other at certain of said points, and said walls at other of said points having limited lateral movement therebetween.

3. A cushion of the character described having, in combination, an inflatable bag of soft, flexible material, two opposite walls of said bag connected to each other at a plurality of points distributed over the area of said walls so as to restrict relative separating movement between said walls at said points when the bag is inflated, the degree of said restriction to separating movement being different at certain different of said points.

4. A cushion of the character described having, in combination, an inflatable bag of soft, flexible material, two opposite walls of said bag connected to each other at a plurality of points distributed over the area of said walls so as to restrict relative separating movement between said walls at said points when the bag is inflated, the degree of said restriction to separating movement being different at certain different of said points, and the resistance to relative lateral movement between said walls being greater at certain of said connected points than at other of said connected points.

5. A cushion of the character described having, in combination, an inflatable bag of soft, flexible material, and means for imparting to different parts of the load supporting area of the inflated bag different degrees of stability, said means including elastic ties of soft material extending between and connecting two opposite walls of the bag at each of a plurality of points distributed over the area of said walls, the resistance to elongation of the ties at certain of said points being greater than that of the ties at others of said points.

6. A cushion of the character described having, in combination, an inflatable bag of soft, flexible material, and means for imparting to different parts of the load supporting area of the inflated bag different degrees of stability, said means including elastic ties of soft material extending between and connecting two opposite walls of the bag at each of a plurality of points distributed over the area of said walls, certain of said ties having lower resistance to transverse bending as compared with that of others.

7. A cushion of the character described having, in combination, an inflatable bag of soft, flexible material, and means for imparting to different parts of the load supporting area of the inflated bag different degrees of stability, said means including elastic ties of soft material extending between and connecting two opposite walls of the bag at each of a plurality of points distributed over the area of said walls, said walls being connected against lateral movement relative to each other at each of a plurality of other distributed points.

8. A cushion of the character described having, in combination, an inflatable bag of soft, flexible material, one face of which bag has areas in different planes when the bag is inflated, the opposite walls of said bag connected against lateral movement therebetween at a plurality of points distributed over one of said areas, said walls, at an area in a different plane, being connected by elastic ties of soft material.

9. A cushion of the character described having, in combination, an inflatable bag of soft rubber, two opposite walls of said bag being connected at a plurality of different points distributed thereover, the connecting means including soft rubber ties of substantial length extending between said walls at certain of said points, said walls, at others of said points, being elastically bound together in close proximity to each other against free lateral movement.

10. A cushion of the character described having, in combination, an inflatable bag of soft rubber, and a plurality of soft rubber ties extending between and connecting two opposite walls of said bag at points distributed over the area of said walls, when the bag is inflated, certain of said ties being of relatively large diameter to others and forming cushions interiorly of the bag.

11. A cushion for seats and the like consisting, in combination, of an inflatable bag of soft, elastic material, the upper and lower walls of the bag fastened together at a number of different points against lateral movement relative to each other, and at each of a number of other and different points connected for restricted lateral movement relative to each other by a tie of soft elastic material between said walls, said walls inclining toward each other when the bag is inflated, said fast points being adjacent the shallow part of the bag and said ties being at the deep end of the bag.

12. A cushion for seats and the like consisting, in combination, of an inflatable rubber bag, wedge shaped in longitudinal section when inflated, the upper and lower walls of said bag tied together against lateral movement relative to each other at a number of different points at the shallow end of the bag, the bag having a flexible, tubular rubber tie at each of a number of different points over the deeper area of the bag, said ties extending from the upper to the lower wall of the bag across the air space of the bag, and being integral parts of the rubber bag.

13. A cushion of the character described including, in combination, an inflatable bag of soft, flexible material, opposite walls of said bag connected to each other by soft elastic ties distributed over the area of said walls, certain of said ties being hollow balls, said walls having openings communicating with the interior of said balls.

In testimony whereof I affix my signature.

GEORGE HOUGH PERRY.